United States Patent [19]
Meng et al.

[11] Patent Number: 6,144,918
[45] Date of Patent: Nov. 7, 2000

[54] NAVIGATION DATA PROCESSING WITH FILTERING FOR REFINED POSITION DETERMINATION

[75] Inventors: Teresa M. Meng, Portola Valley; Horng-Wen Lee, Cupertino, both of Calif.

[73] Assignee: Stanford University, Palo Alto, Calif.

[21] Appl. No.: 09/211,449

[22] Filed: Dec. 15, 1998

[51] Int. Cl.[7] .................................................. G06F 165/00
[52] U.S. Cl. ........................ 701/207; 701/116; 701/213; 701/216; 342/357.01; 342/357.02; 342/357.08; 342/457
[58] Field of Search .................................... 701/116, 216, 701/220, 207, 208, 200, 213, 221, 205, 224, 226, 215, 222, 300; 342/156, 357.01, 357.02, 357.03, 357.07, 357.08, 358, 457, 424

[56] References Cited

U.S. PATENT DOCUMENTS

| | | | |
|---|---|---|---|
| 3,952,304 | 4/1976 | Bronivitz et al. | 342/95 |
| 4,646,096 | 2/1987 | Brown | 342/357.02 |
| 4,930,085 | 5/1990 | Kleinschmidt | 701/207 |
| 5,019,824 | 5/1991 | Kumar | 342/195 |
| 5,136,550 | 8/1992 | Chambers | 367/38 |
| 5,211,829 | 5/1993 | Imai et al. | 204/603 |
| 5,216,611 | 6/1993 | McElreath | 701/221 |
| 5,296,861 | 3/1994 | Knight | 342/357.11 |
| 5,375,059 | 12/1994 | Kyrtsos et al. | 701/215 |
| 5,383,127 | 1/1995 | Shibata | 701/216 |
| 5,386,368 | 1/1995 | Knight | 701/116 |
| 5,390,125 | 2/1995 | Sennott et al. | 701/214 |
| 5,416,712 | 5/1995 | Geier et al. | 701/216 |
| 5,420,592 | 5/1995 | Johnson | 342/357.12 |
| 5,451,964 | 9/1995 | Babu | 342/357.06 |
| 5,543,804 | 8/1996 | Buchler et al. | 342/357.08 |
| 5,546,309 | 8/1996 | Johnson et al. | 701/13 |
| 5,555,503 | 9/1996 | Kyrtsos et al. | 701/207 |
| 5,583,774 | 12/1996 | Diesel | 701/200 |
| 5,606,506 | 2/1997 | Kyrtsos | 701/207 |
| 5,610,815 | 3/1997 | Gudat et al. | 701/23 |
| 5,646,857 | 7/1997 | McBurney et al. | 701/213 |
| 5,657,232 | 8/1997 | Ishikawa et al. | 701/215 |
| 5,672,872 | 9/1997 | Wu et al. | 250/330 |
| 5,689,420 | 11/1997 | Brewster | 701/14 |
| 5,740,048 | 4/1998 | Abel et al. | 701/200 |
| 5,760,737 | 6/1998 | Brenner | 342/357.02 |
| 5,774,829 | 6/1998 | Cisneros et al. | 701/213 |
| 5,787,384 | 7/1998 | Johnson | 701/216 |
| 5,805,200 | 9/1998 | Counselman, III | 342/357.08 |

OTHER PUBLICATIONS

P. Axelrad and R.G. Brown "GPS Navigation Algorithms," *Global Positioning System: Theory and Application*, by B.W. Parkinson, AIAA, 1996 pp. 412–417.

R.G. Brown, *Introduction to Random Signals and Applied Kalman Filtering*, John Wiley & Sons, 1992, pp. 414–423.

T. Kailath, *Linear Systems*, Prentice Hall, 1980, pp. 259–268.

S. Haykin, *Adaptive Filter Theory*, Prentice Hall, 1996, pp. 302–322.

Maury Wright, "Time, Position, and Velocity? Just Ask Your GPS Chip Set," *EDN*, Mar. 3, 1997, pp.50–66.

R.J. Milliken, and C. J. Zoller, "Principle of Operation of NAVSTAR and System Characteristics," *Navigation*, vol 25, pp. 95–106, Summer 1978.

M. Kihara, and T. Okada, A Satellite Selection Method and Accuracy for the Global Positioning System, *Navigation*, vol.

*Primary Examiner*—William A. Cuchlinski, Jr.
*Assistant Examiner*—Gertrude Arthur

[57] ABSTRACT

Consistent with one embodiment of the invention, a GPS signal processing system uses a behavior observer to monitor user dynamics and to aid a time-varying-gain filter arranged to perform continuous position and speed estimates. The behavior observer consists of a fast observer and a signal detector. The fast observer tacks user maneuvers. The signal detector compares outputs of the fast observer and the time-varying-gain filter to determine user dynamics and corrects operations of the time-varying-gain filter. Tracking ability is improved without degradation in steady-state position accuracy.

33 Claims, 2 Drawing Sheets

NAVIGATION DATA PROCESSING WITH FILTERING FOR REFINED POSITION DETERMINATION

FIELD OF THE INVENTION

The present invention relates generally to signal communication. More particularly, the present invention relates to signal communication systems and methods and arrangements for receiving and processing such signals in an effective manner. Particular embodiments of the present invention relate to the Global Position System ("GPS") and to GPS receivers used for navigation and signal tracking.

BACKGROUND OF THE INVENTION

The Global Positioning System (GPS) is a satellite navigation system developed by the United States in the 1980s. When appropriately used, GPS can provide accurate positioning and timing information for both military and civil applications. The central function of a GPS navigation algorithm is to estimate the user position and any required parameters based on noisy observations of satellite signals. A typical GPS receiver comprises three blocks: a radio-frequency ("RF") front-end, a demodulator, and a navigation processor. The RF front-end receives radio signals from satellites and converts them into a suitable form for the demodulator. The demodulator retrieves navigation data from the signals and performs phase measurements to calculate pseudo-ranges between satellites and the receiver. The navigation processor, a key component in the receiver, then estimates user position with this information.

A conventional navigation processor uses a short burst in navigation data to predict the position of all visible satellites and then chooses at least four satellites as data sources for use by a functional "single-point solver" block, for example as characterized in *Global Positioning System: Theory and Application*, B. W. Parkinson et al., AIAA, 1996. The single point solver, then, determines the user's position. After that, a self-regulated time-varying-gain filter further smoothes these position determinations.

The GPS receiver's determination of the user's position is based on measurements of phases of pseudo-random codes, as received in the GPS data streams, to estimate distances between satellites and the user. These user position estimates, however, are merely estimates and not precisely accurate. To improve the accuracy, an averaging process, such as time-varying-gain filtering, is used. Such an averaging process is based on the premise that a longer averaging period will yield a smaller averaging variance. Time-varying-gain filtering provides an on-line optimal processing and has been used extensively in navigation applications. For further information concerning such data processing, reference may be made to the above-mentioned article, and to *Introduction to Random Signals and Applied Kalman Filtering*, by R. G. Brown et al., John Wiley & Sons, 1992, and to *Kalman Filtering, Theory and Application*, H. W. Sorenson, IEEE Press, 1985.

Kalman filtering is widely used largely due to its ability to optimally minimize the mean square error of position estimates. Conventional use of the Kalman filtering process suffers, however, from sluggish response to dynamic maneuvers if the receiver does not provide information on user dynamics. To avoid this shortcoming, conventional applications have used supplementary devices, such as speedometers or an internal inertial systems, to provide such information.

GPS receivers can also utilize Doppler shift on the carrier to acquire user dynamics. The most commonly used method is the delta range that is an approximate measurement of the user velocity. However, this only improves tracking for low dynamic users. For highly dynamic applications, a better velocity profile can be obtained by carrier aiding. The method of carrier aiding performs a continuously-running integration of Doppler shift instead of a short interval integration, which is done in delta ranging. These measurements, unfortunately, are all very noisy and cycle slips further degrade communication.

GPS-type receivers are used in a wide variety of lightweight, low-power, portable, and/or mobile electronic devices. Many marketplace applications demand that such devices be implemented with higher degrees of navigation and tracking accuracy. Unfortunately, a major design issue in such receivers is the inability to achieve significantly improved tracking ability without degrading steady-state position accuracy.

Accordingly, a need exists for navigation arrangements and methods that address the demands of the marketplace and overcome the above-mentioned problems.

SUMMARY OF THE INVENTION

Various implementations of the present invention assist in filtering signals for a navigation processor-based receiver adapted to process signals in a stand-alone global positioning system (GPS). According to certain embodiments, a behavior observer block operates to monitor user dynamics and to aid a Kalman filter that is adapted to perform continuous position and speed estimates. The behavior observer block consists of a fast observer and a signal detector. The fast observer tacks user maneuvers. The signal detector compares outputs of the fast observer and the Kalman filter to determine user dynamics and corrects operations of the Kalman filter. Dramatic improvements on tracking ability are achieved without degradation in steady-state position accuracy.

One particular example embodiment of the present invention is directed to an arrangement for processing position information in a communication system. The arrangement includes: a processor arrangement adapted to include a behavior observer block that detects changes in movement in the arrangement and, in response thereto, generates data indicative of position estimations using a linearized least square algorithm; and the processor arrangement further configured and arranged to include a time-varying-gain filter adapted to average the generated data indicative of position estimations.

More specific applications of the present invention are directed to a receiver arrangement for navigation in a GPS type communication system. The receiver arrangement includes a processor arrangement with a behavior observer block and with a time-varying-gain filter, both adapted as described above, and wherein the behavior observer block is further adapted to filter the position estimations by determining a best-performance factor for noise reduction, and by providing responsive tracking of user dynamics while reducing only a portion of present noise Another particular embodiment of the invention is directed to a communication system application involving a method for processing position information corresponding to the position of a moveable device. The method comprises: detecting changes in movement in the device; in response, generating data indicative of position estimations using a linearized least square algorithm; and using a time-varying-gain algorithm to average the generated data indicative of position estimations.

Yet another aspect of the present invention is directed to a method used for processing position information corresponding to the position of a moveable device in a communication system. The method comprises: detecting changes in movement in the device; in response, generating data indicative of position estimations; and using a time-varying-gain algorithm to average the generated data indicative of position estimations.

Another more specific aspect of the present invention is directed to a processing arrangement for processing position information in a communication system. The processing arrangement includes: a satellite selector adapted to process navigation data; a single point solver responsive to the satellite selector and to pseudo-range data and adapted to generate data representing position estimations; a filter arrangement responsive to the data representing position estimations and including a behavior observer and a time-varying-gain filter, the behavior observer adapted to detect changes in movement in the processing arrangement and, in response thereto, to generate data indicative of refined position estimations using a linearized least square algorithm, and the time-varying-gain filter adapted to average the generated data indicative of refined position estimations.

In yet a more specific embodiment of the present invention, the above-characterized processing arrangement includes a programmable data processing circuit configured and arranged to implement operation of at least one of: the satellite selector, the single point solver and the filter arrangement.

Other particular embodiments of the present invention are directed to methods, apparatuses and specific aspects relating to the above-characterizations.

BRIEF DESCRIPTION OF THE DRAWINGS

Various aspects and advantages of the present invention will become apparent upon reading the following detailed description of various embodiments and upon reference to the drawings in which.

Figure 1:
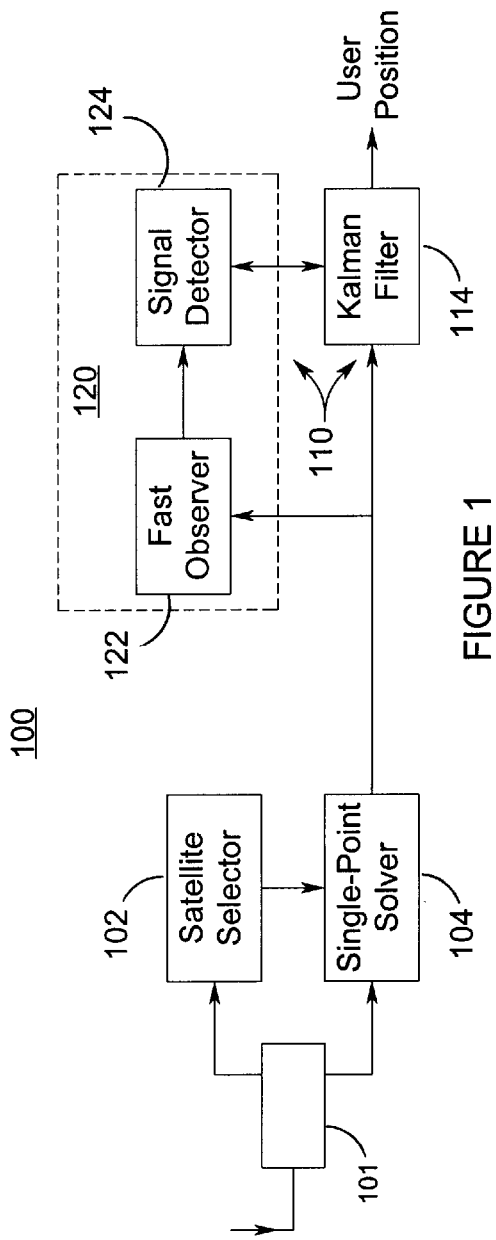
FIG. 1 is a block diagram of a receiver arrangement, implemented according to an example embodiment of the present invention.

While the invention is amenable to various modifications and alternative forms, specifics thereof have been shown by way of example in the drawings and will be described in detail. It should be understood, however, that the intention is not to limit the invention to the particular embodiment described. On the contrary, the invention is to cover all modifications, equivalents, and alternatives falling within the spirit and scope of the invention as defined by the appended claims.

DETAILED DESCRIPTION

The present invention is believed to be applicable to a variety of systems and arrangements that process incoming streams of data, such as data used for navigation and signal tracking. The present invention has been found to be particularly advantageous for used for navigation and signal tracking in connection with the Global Position System ("GPS") and with GPS receiver arrangements, in which a front-end receiver circuit measures phases of pseudo-random codes to determine distances between satellites and the user. An appreciation of the invention may be ascertained through a discussion in the context of such system applications.

An example application of the present invention is illustrated by way of FIG. 1 in which a receiver arrangement processes GPS-generated position data using a processor-based circuit arrangement 100. The circuit arrangement 100 includes, among other functional blocks, RF front-end/demodulator circuitry 101, a satellite selector 102 and a single-point solver 104. In response to the circuitry 101, satellite selector 102 uses the ephemeris in navigation data to predict the position of all visible satellites and chooses therefrom at least four satellites for the single-point solver 104. For these satellites, the single point solver 104 then processes the pseudo-range data portion of the received GPS signal and, therefrom, generates data representing relatively course position estimations. These relatively course position estimations are refined by a filter arrangement 110 that includes a behavior observer 112 and a time-varying-gain filter 114 (exemplified in FIG. 1 as a Kalman filter). As the user moves with the device (e.g., the processor-based circuit arrangement 100), the behavior observer 120 detects such movement and, in response, the time-varying-gain filter 114 generates data indicative of refined position estimations. These position estimations are then used to indicate the position of the user. The RF front-end/demodulator circuitry 101, the satellite selector 102 and the single-point solver 104 may be implemented using GPS processing techniques, as is readily recognized by the skilled artisan.

A more specific embodiment of the circuit arrangement 100 of FIG. 1 uses a linearized least square algorithm, and the time-varying-gain filter is adapted to average the generated data indicative of the refined position estimations.

Other more specific embodiments of the present invention use different types of data processing logic to implement the above-characterized processing arrangement. One such embodiment includes a programmable data processing circuit having at least one programmable processor configured and arranged to implement operation of each of the circuits 102, 104 and 110 of FIG. 1. Another embodiment implements the filter arrangement 110 of FIG. 1 using at least one DSP-type programmable processor (e.g., a TMS-type DSP processor available from Texas Instrument or a competitive DSP processor) dedicated to the above-described filtering operations of the filter arrangement 110. Those skilled in the art will appreciate that other data processing arrangements and data processing circuits (e.g., custom and semi-custom logic arrays) can also be used with or in place of the above-exemplified circuits.

In accordance with another example implementation of the present invention, the processing arrangement 100 of FIG. 1 generates a single position estimate as a position measurement at each instant in which the navigation data is sampled, and each single-point position estimate contains only information at that sampling time. The filter 114 of FIG. 1 explores information in the sampling sequence consisting of these estimates and improves estimation accuracy by performing averaging on them.

Figure 2:
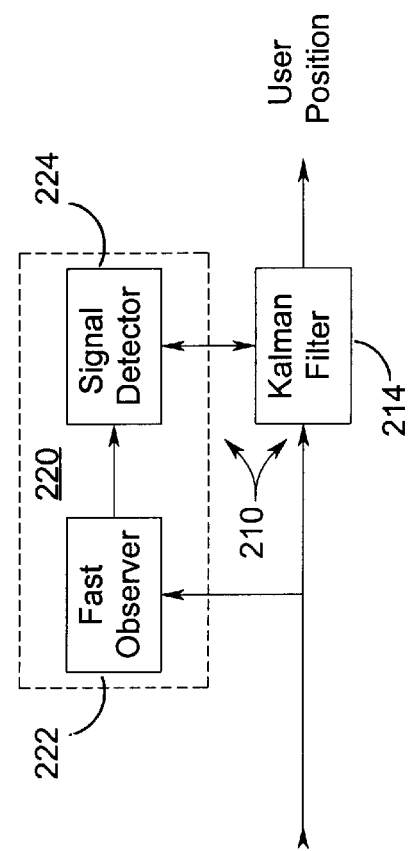
FIG. 2 is a block diagram of a receiver arrangement, implemented according to another example embodiment of the present invention.

FIG. 2 is another block diagram of a receiver arrangement, implemented according to another example embodiment of the present invention. The receiver arrangement of FIG. 2 illustrates a filter processing arrangement for processing single-point position estimates in response to a front-end stage (not shown). The front-end stage can be implemented in a number of ways, including the arrangement as shown in connection with FIG. 1, and also using an RF front-end analog receiver feeding an analog-to-digital converter (ADC), with the output of the ADC being processed by a programmed logic array, and/or by discrete circuitry, to provide data that parallels the data output from the single point solver 104 of FIG. 1. Corresponding blocks are similarly depicted in FIGS. 1 and 2 using parallel reference numerals; thus, the filter arrangement is depicted as 110 or 210, and each includes a behavior observer 120 or 220, implemented using a fast observer 122 or 222 and a signal detector 124 or 224. For each of FIGS. 1 and 2, the behavior observer 120 or 220 monitors changes of user maneuvers and aids the time-varying-gain filter 114 or 214 in the tracking of the single-point estimate information.

According to an example implementation of the present invention, the basic structures of the fast observer and the time-varying-gain filter are similar. A notable difference is the relative emphasis on tracking ability and noise reduction performance. The time-varying-gain filter uses the optimal parameter to obtain the best performance on noise reduction while the fast observer chooses a setting to provide a responsive tracking by trading off noise-removing ability. Since they are both in the forms of an observer, a generic observer design is discussed first and followed by a discussion of their respective individual designs.

According to the present invention, the generic observer design is based on a user model and a measurement model. There are many ways of modeling user behavior, such as is discussed in connection with *Introduction to Random Signals and Applied Kalman Filtering,* by R. G. Brown et al., John Wiley & Sons, 1992. With the state-space representation, the following user model is used.

$$X_{k+1} = AX_k + u_k + w_k, \quad A = \begin{bmatrix} 1 & 1 \\ 0 & 1 \end{bmatrix}$$

where $X_k$ is the state vector comprised of the user position and velocity, A describes the relationship between position and velocity, $u_k$ symbolizes a fictitious input signal representing user's behavior, and $w_k$ is a random variable to account for any uncertainty in the model. With the assumption of independence between spatial axes, a one-dimensional description is sufficient to capture the dynamics. Included in the model are only position and velocity information since acceleration period for a roaming user is usually short. Single-point solution approaches, for example, as described in *Global Positioning System: Theory and Application,* B. W. Parkinson et al., AIAA, 1996, are used as input to the observer. Consistent with the present invention, such single-point solution approaches are modeled as the following measurement process.

$$y_k = cX_k + v_k, \quad c = [1 \ 0]$$

The matrix c retrieves the position from the state vector, and this retrieved position combined with measurement noise $V_k$, forms the measured position $y_k$.

The system consisting of the above user model and the measurement model is observable. According to another example implementation, an observer is used to estimate the states in the models characterized at pages 259–268 of Kailath, T., *Linear Systems,* Prentice Hall, 1980. Using $Z_k$'s to represent estimated states and $K_k$ to denote a weighting factor, the following behavior observer is realized:

$$z_k = (I - K_k c)(A Z_{k-1} + u_{k-1}) + K_k y_k.$$

For stand-alone GPS applications, the input $u_k$ is not directly available from position measurements. An autonomous model is used by assuming that the value of $u_k$ is zero.

The estimation errors of the observer can be analyzed by fixing the weighting factor K. Defining the estimation error as $e_k = X_k - Z_k$, the following relationship is realized:

$$e_k = (I - Kc)u_{k-1} + \ldots + G^{n-1}(I - Kc)u_o + N_k,$$

where $G = (I - Kc) A$, and $N_k = n_{k-1} + Gn_{k-2} + G^2 n_{k-3} + \ldots + G^{k-1} n_o$. If the input does not diminish, estimation errors accumulate and become unbounded. Thus, the observer having an autonomous user model can track input with sufficient short duration. For pulsed inputs, the decaying rate of errors is determined by the eigenvalues of the parameter G. Recognizing that inputs can be implemented in other forms, consistent with the example embodiments discussed herein, it is assumed that all inputs are pulsed. This does not limit the application of these embodiments since duration for continuous acceleration is usually short and the system tracks the acceleration in a manner that, during this period, zigzags. "Zigzag" refers to the system repeatedly locking onto the speed when the filter converges, and restarting the filter when the accumulated error is greater than a threshold and locks onto another speed when the filter converges again.

According to a specific example implementation of the present invention, a time-varying-gain filter, such as the filter 114 of FIG. 1, is designed based on the above observer. The weighting factor for the time-varying-gain filter is given by following equations:

$$K_k = P_k c^T (c P_k c^T + R)^{-1},$$

and $$P_{k+1} = A (I - K_k c) P_k A^T + Q;$$

where $P_k$ denotes estimation error covariance matrix at time k, and the covariance matrices of $w_k$ and $v_k$ are represented by R and Q, respectively. Since the above equations do not depend on actual measurements, according to one example embodiment, the weighting factors are predetermined and the dynamic response of the filter is limited by the eigenvalues of G, where $G = (I - K c) A$, and where K is the steady-state weighting factor. For further information concerning such equations, reference may be made to Haykin, S., *Adaptive Filter Theory,* Prentice Hall, 1996.

The behavior observer 120 of FIG. 1 consists of the fast observer 122 and the signal detector 124. The fast observer 122 provides responsive tracking of user dynamics while reducing only part of the noise. The signal detector 124 compares the outputs of the fast observer 122 and the time-varying-gain filter 114, and determines if an input pulse has arrived. If a pulse is detected, it issues a correction signal to the time-varying-gain filter 114 to aid the tracking of the time-varying-gain filter 114.

The fast observer 122 of FIG. 1 uses the observer structure described above in connection with the generic observer model, but with a fixed weighting factor. To distinguish the fast observer from the time-varying-gain filter, different symbols are used. Assuming a pulsed input with amplitude a has arrived, the estimation error, $h_k$, due to such an input, is given as:

$$h_k = F^{k-1}(I-L\ c)a + M_k,$$

where L is the weighting factor, where $F=(I-L\ c)\ A$, and where $$M_k = \sum_{j=1}^{k} F^{j-1}(Lv_{k-j+1} - (I-Lc)w_{k-1}) = \sum F^{j-1} m_j$$

The error decaying rate, or the tracking ability of the fast observer, is determined by the eigenvalues of F. These eigenvalues are adjustable by the weighting factor L. The variance of residual errors $M_k$ is calculated as $$\sigma^2 = E[m_k\ m] = (L\ R\ L^T + (I-L\ c)\ Q(I-L\ c)^T)\delta_{k-j}$$

In connection with the present invention, from this relationship it has been recognized that improvement in tracking ability increases the residual errors.

Figure 3:
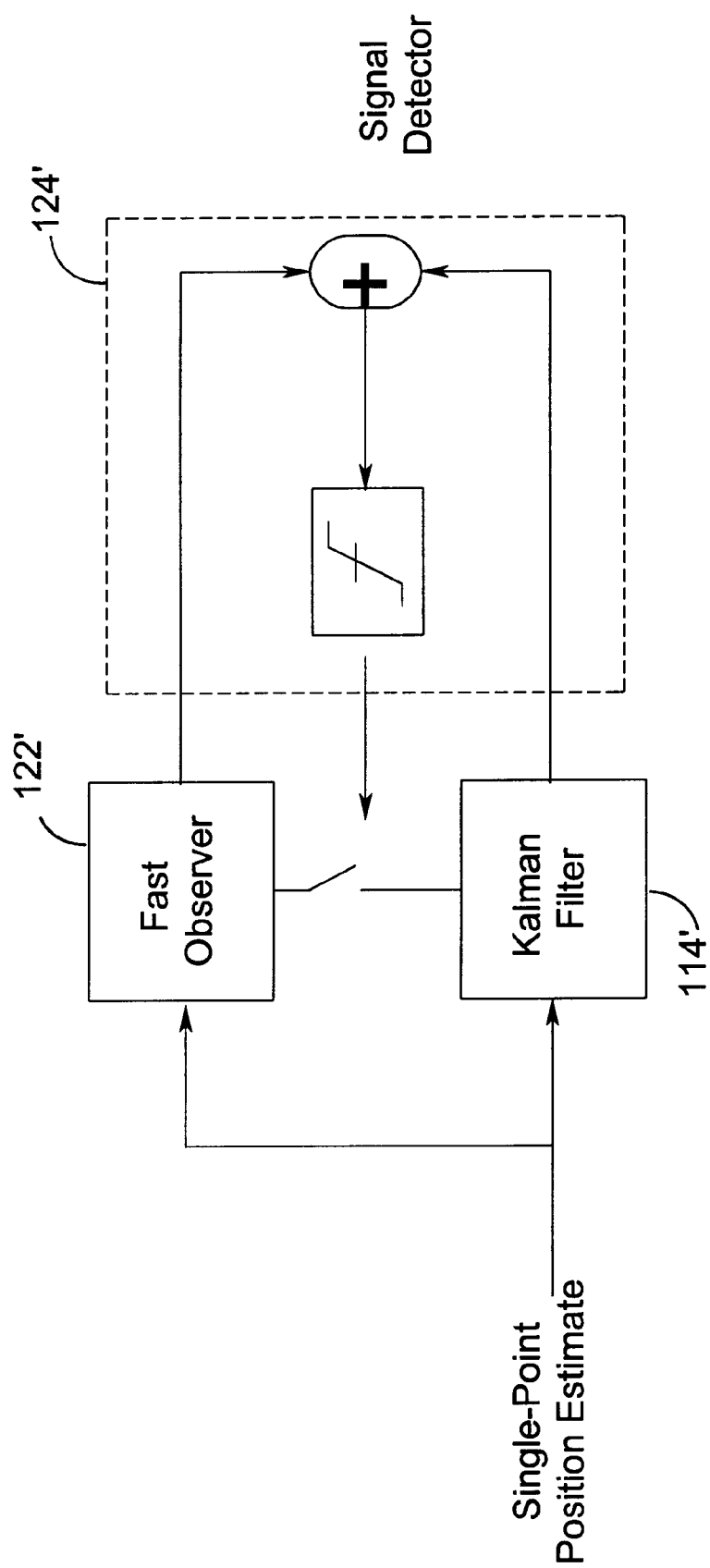
FIG. 3 is a detailed block diagram showing an example implementation of a signal detector portion of a navigation data receiver arrangement, for example, as may be used in connection with one or both of the arrangements of FIGS. 1 and 2.

Referring now to FIG. 3, an example implementation of the signal detector 124 of FIG. 1 is shown in expanded form. The differences between outputs of the fast observer and the time-varying-gain filter, $Z=\{z_1, z_2, \ldots\}$, are used as inputs to the detector and are assumed to be independent, identical Gaussian random variables with variance $\sigma^2$. If an input pulse with amplitude a arrives, the means of differences change from o to a. A maximum likelihood detector is implemented using the generalized likelihood ratio algorithm as described in connection with, Basseville, M., Nikiforov, I. V., *Detection of Abrupt Changes: Theory and Application,* Prentice Hall, 1993. Using a matched filter with window size N, the last N differences are evaluated and calculated as:

$$\Sigma_N Z_i/\sqrt{N}$$

If the value is greater than an assigned threshold h, the arrangement assumes the arrival of a pulse. In response, states of the time-varying-gain filter are replaced with that of the fast observer, and the weighting sequence of the time-varying-gain filter restarts.

The performance of the detector is specified by factors known as the false alarm rate and the missing rate. A false alarm perturbs the time-varying-gain filter and degrades its performance. According an example aspect of the present invention, the false alarm rate is $P_{false}=2\ Q(h/\sigma)$, where $Q(x)$ is the error function. A miss reduces the tracking ability of the time-varying-gain filter and accumulates estimation errors. Assuming a pulse with amplitude a arrives at time zero, the probability that it will be detected at some later time j is:

$$P_j = Q((h-u_j)/\sigma) + Q((h+u_j)/\sigma);$$

where $u_j = a\sqrt{j}$ for $j<N$, and $u_j = a\sqrt{N}$ for $j \geq N$. Thus, the missing rate is: $P_{miss} \cong 1 - P_1 - P_2 \ldots - P_N$.

Many GPS receivers use floating-point arithmetic for the navigation processors. Examples of such math for navigation processors is discussed in connection with Wright, M., "Time, Position, and Velocity? Just Ask Your GPS Chip Set", EDN, pp.50–66, Mar. 3, 1997. According to an example embodiment of the present invention, for portable applications fixed-point arithmetic is used. Because fixed-point arithmetic requires shorter word-length than that of floating-point arithmetic for a given precision, power consumption can be reduced. In addition, fixed-point arithmetic makes the ASIC design easier. In connection with the present invention, different scaling factors are applied at different stages and fixed-point arithmetic is used for the data processing. Thus, while the math is different, the overall performance is similar to that of floating-point arithmetic.

There are two observers, the fast observer and the time-varying-gain filter, in this system. The fast observer uses a short averaging window and is less sensitive to accumulated truncation errors. The time-varying-gain filter uses a long averaging window and is more pruned to accumulated truncation errors. However, if the time-varying-gain filter does diverge due to accumulated errors, the behavior observer will detect the deviation eventually and correct it by restarting the time-varying-gain filter.

The structures of the fast observer and the time-varying-gain filter can be reformulated as:

$$[\Delta pos_n vel_n]^T = [I-K_{p,n}\ I-K_{v,n}]^T\ vel_{n-1} + [K_{p,n}\ K_{v,n}]\Delta y_n,$$

where $\Delta y_n = y_n - pos_{n-1}$. The user position and velocity at time n are denoted as $pos_n$ and $vel_n$, respectively. The weighting factor is $[K_{p,n}\ K_{v,n}]^T$. Although positions can have large dynamic range, the change of positions, $\Delta pos_n = pos_n - pos_{n-1}$, will be on the order of user velocity which tends to have a small dynamic range. Thus, fixed-point arithmetic can be used for this differential mode observer.

Two numerical representations are used for the above observer. One is for $y_n$, $pos_n$ and $vel_n$, and the other set is for the rest of numbers involved. The error budget for a precise position service (PPS) is about five meters and the orbit radius of the semi-major axis is 26,561.75 km. These two numbers determine the dynamic range of the first number set as $5.3 \times 10^6$, or 22.3 bits. Using a conservative design approach, thirty bits are used for this set of numbers. Taking account the speed of a car, the user speed is assumed to be smaller than sixty miles per hour. The updating rate of position information is one Hertz, in accordance with implementations consistent with the present invention, and this yields:

$$|\Delta pos_n| < 30.$$

With a conservative margin, ten bits are used for the integer part of the numbers in the second data set. Due to the feedback nature of the time-varying-gain filter, simulation is used to determine the number of bits needed for the fractional part. The result shows that at least fifteen bits are required to provide a stable system. Thus, the total bits required for the second set of data are twenty-six bits, including a sign bit.

Given satellite positions and measured pseudo-ranges, the difference, $\Delta p$, is calculated between the predicted pseudo-range and the measured pseudo-range. As described in Parkingson, B. W., Spilker, J. J., Axelrad, P. and Enge, P. editors, *Global Positioning System: Theory and Application,* AIAA, 1996, the relationship between $\Delta p$ and the user position correction, $\Delta x = x_{actual} - 1_{predicted}$, is $\Delta p = G\ \Delta x + \Delta \epsilon_p$, where $\Delta \epsilon_p$ is the residual error, and G is the geometry matrix. The value $\Delta x$ can be estimated as the least squares solution to the normal equation, as being equal to $(G^T G)^{-1}\ G^T\ \Delta p$.

Since it is sufficient to use four satellites in order to determine user position and clock offset, the solution can be reduced to $\Delta x = G^{-1} \delta p$. Letting $G_{ij}$'s represent co-factors of the geometry matrix, $$G^{-1} = \frac{1}{\det(G)} \begin{bmatrix} G_{11} & -G_{12} & G_{13} & -G_{14} \\ -G_{21} & G_{22} & -G_{23} & G_{24} \\ G_{31} & -G_{32} & G_{33} & -G_{34} \\ -G_{41} & G_{42} & -G_{43} & G_{44} \end{bmatrix}$$

where $\det(G) = G_{14} - G_{24} + G_{34} - G_{44}$. Because each row of the geometry matrix is in the form of $[l_j\ m_j\ n_j\ -1]$, where $[l_j\ m_j\ n_j]$ is the estimated line of sign unit vector from the user to satellite j, absolute values of numbers involved in the above matrix inversion will have a dynamic range from $1 \times 10^{-6}$ to five. With this dynamic range, twenty-three bits will be sufficient, including the sign bit.

With making elevation angle of five degrees, GPS provides six to twelve visible satellites to users. The satellite selector chooses four satellites from them for position determination. Selection algorithms usually use measures of Geometric Dilution of Precision (GDOP$^2$=trace(($G^T G$)$^{-1}$)) as criterion. All combinations of four satellites picking from the visibles are calculated and the combination giving the smallest GDOP is selected. For further information concerning such satellite selection, reference may be made to Milliken, R. J., and Zoller, C. J., *Principle of Operation of NAVSTAR and System Characteristics, Navigation*, vol. 25, pp.95–106, Summer 1978. This method imposes a relatively large computation burden when the number of visible satellites is large. Alternatively, a selection method is based on the volume of the geometry. For further information concerning this satellite selection method, reference may be made to Kihara, M., and Okada, T., *A Satellite Selection Method and Accuracy for the Global Positioning System, Navigation*, vol. 31, no 1, pp.8–20, Spring 1984.

In accordance with this approach, there is a high correlation between the volume of the tetrahedron formed by the line of sight vectors and GDOP. Taking this into account and in accordance therewith, the following example process is used:

Step 1: Select the satellite sv1 which has the largest elevation angle.

Step 2: Select the satellite sv2 that has the angle to sv1 nearest to 109.5 degrees.

Step 3: Select the satellite sv3 that maximizes the following volume:

$$V = \left[\sqrt{2(1-l_2)(2+l_3)(1-l_2 l_3 - m_2 m_3)} + |m_2 m_3|\right](1-l_3)$$

Step 4: Select the satellite sv4 that maximizes the volume of the tetrahedron.

Based on the previous discussion of implementation, the operation counts for every position update are realized as shown in Table 1.

TABLE 1

| | Time-varying-gain Filter (30 bits) | Fast Observer (30 bits) | Single-point Solver (23 bits) | Satellite Selector (23 bits) |
|---|---|---|---|---|
| Addition | 4 | 4 | 83 | 240 |
| Multiplication | 4 | 4 | 193 | 410 |

Since the position-updating rate is usually one Hertz and the operation count for each updating is low, a fixed-point arithmetic controller is used with small word length to perform the calculation recursively. Alternatively, fixed-point arithmetic controller is included in the arithmetic unit of a demodulator, such as the synchronizer discussed in connection with U.S. patent application Ser. No. 60/102, 865, filed on Oct. 2, 1998.

For other implementations, applications, features and details relating to the background and supporting information for the above-discussed embodiments of the present invention, reference may be made to the various references identified herein and to other related materials. These materials made of record herewith are incorporated herein by reference in their entirety.

Accordingly, various embodiments of the present invention provide a self-regulated GPS navigation processor approach. By using a behavior observer to supplement a time-varying-gain filter, requirements for responsive tracking and good noise reduction performance can be achieved. This aided time-varying-gain filter also relaxes the design of a demodulator. The fixed-point arithmetic implementation, as discussed above, improves overall estimation accuracy. Without requiring any external navigation aids, the present invention facilitates the design efforts of a low-cost and low-power GPS system for roaming users.

The various embodiments described above are provided by way of illustration only and should not be construed to limit the invention. Those skilled in the art will readily recognize various modifications and changes which may be made to the present invention without strictly following the exemplary embodiments and applications illustrated and described herein. Such variations do not depart from the true spirit and scope of the present invention which is set forth in the following claims.

What is claimed is:

1. In a communication system, an arrangement for processing position information, comprising:

a processor arrangement configured and arranged to include a behavior observer block adapted to detect changes in movement in the arrangement and, in response thereto, to generate data indicative of position estimations using a linearized least square algorithm; and the processor arrangement further configured and arranged to include a time-varying-gain filter adapted to average the generated data indicative of position estimations.

2. An arrangement for processing position information, according to claim 1, further including means for processing the position information as received at a radio frequency and for demodulating the position information for use by the behavior observer block and for the time-varying-gain filter, and wherein the time-varying-gain filter is further adapted to yield a relatively small averaging variance as a result of averaging the generated data indicative of position estimations.

3. An arrangement for processing position information, according to claim 1, wherein the behavior observer block is further adapted to filter the position estimations by determining a best-performance factor for noise reduction, and by providing responsive tracking of user dynamics while reducing only a portion of present noise.

4. An arrangement for processing position information, according to claim 3, wherein the behavior observer includes a Kalman filter adapted to determine a best-performance factor for noise reduction.

5. An arrangement for processing position information, according to claim 3, wherein the behavior observer includes a functional observer block adapted to provide responsive tracking of user dynamics while reducing only a portion of present noise.

6. An arrangement for processing position information, according to claim 1, wherein the behavior observer includes a time-varying-gain filter adapted to determine a best-performance factor for noise reduction, and includes a functional observer block adapted to provide responsive tracking of user dynamics while reducing only a portion of noise in the position information.

7. An arrangement for processing position information, according to claim 6, wherein the behavior observer further includes a functional comparator block adapted to compare respective outputs generated by the time-varying-gain filter and the functional observer block, and to determine whether an input pulse has been received.

8. An arrangement for processing position information, according to claim 7, wherein the functional comparator block is further adapted to use a random process model in comparing the difference of the respective outputs generated by the time-varying-gain filter and the functional observer block.

9. An arrangement for processing position information, according to claim 7, wherein the functional comparator block is further adapted to compare respective outputs generated by the time-varying-gain filter and the functional observer block with a threshold.

10. In a communication system, an arrangement for processing position information, comprising:
   a processor arrangement configured and arranged to include a behavior observer block adapted to detect changes in movement in the arrangement and, in response thereto, to generate data indicative of position estimations; and
   the processor arrangement further configured and arranged to include a time-varying-gain filter adapted to average the generated data indicative of position estimations and to yield a relatively small averaging variance, without accounting for dynamics of the arrangement.

11. An arrangement for processing position information, according to claim 10, wherein the time-varying-gain filter includes means for determining a best-performance factor for noise reduction, and includes means for providing responsive tracking of user dynamics while reducing only a portion of noise in the position information.

12. An arrangement for processing position information, according to claim 11, wherein the time-varying-gain filter further includes means for comparing respective outputs generated by said means for determining a best-performance factor for noise reduction and said means for providing responsive tracking of user dynamics while reducing only a portion of noise in the position information.

13. An arrangement for processing position information, according to claim 10, wherein the time-varying-gain filter is further adapted to yield a relatively small averaging variance as a result of averaging the generated data indicative of position estimations.

14. An arrangement for processing position information, according to claim 10, wherein the behavior observer block is further adapted to filter the position estimations by determining a best-performance factor for noise reduction, and by providing responsive tracking of user dynamics while reducing only a portion of present noise.

15. An arrangement for processing position information, according to claim 14, wherein the behavior observer includes a time-varying-gain filter adapted to determine a best-performance factor for noise reduction.

16. An arrangement for processing position information, according to claim 14, wherein the behavior observer includes a functional observer block adapted to provide responsive tracking of user dynamics while reducing only a portion of present noise.

17. An arrangement for processing position information, according to claim 10, wherein the behavior observer includes a time-varying-gain filter adapted to determine a best-performance factor for noise reduction, and includes a functional observer block adapted to provide responsive tracking of user dynamics while reducing only a portion of noise in the position information.

18. An arrangement for processing position information, according to claim 17, wherein the behavior observer further includes a functional comparator block adapted to compare respective outputs generated by the time-varying-gain filter and the functional observer block, and to determine whether an input pulse has been received.

19. An arrangement for processing position information, according to claim 18, wherein the functional comparator block is further adapted to use a random process model in comparing the difference of the respective outputs generated by the time-varying-gain filter and the functional observer block.

20. In a communication system, a processing arrangement for processing position information, comprising:
   a satellite selector adapted to process navigation data;
   a single point solver responsive to the satellite selector and to pseudo-range data and adapted to generate data representing position estimations;
   a filter arrangement responsive to the data representing position estimations and including a behavior observer and a time-varying-gain filter, the behavior observer adapted to detect changes in movement in the processing arrangement and, in response thereto, to generate data indicative of refined position estimations using a linearized least square algorithm, and the time-varying-gain filter adapted to average the generated data indicative of refined position estimations.

21. In a communication system, a processing arrangement for processing position information, according to claim 20, further including a programmable data processing circuit configured and arranged to implement operation of at least one of: the satellite selector, the single point solver and the filter arrangement.

22. For use in a communication system, a method for processing position information corresponding to the position of a moveable device, comprising:
   detecting changes in movement in the device;
   in response, generating data indicative of position estimations using a linearized least square algorithm; and
   using a time-varying-gain algorithm to average the generated data indicative of position estimations.

23. A method for processing position information corresponding to the position of a moveable device, according to claim 22, wherein using a time-varying-gain algorithm to average the generated data indicative of position estimations is implemented without accounting for dynamics of the device.

24. A method for processing position information corresponding to the position of a moveable device, according to claim 22, further including determining a best-performance factor for noise reduction, and providing responsive tracking of user dynamics while reducing only a portion of noise in the position information.

25. A method for processing position information corresponding to the position of a moveable device, according to claim 24, further including comparing responses to the steps of determining and providing responsive tracking.

26. A method for processing position information corresponding to the position of a moveable device, according to claim 22, further including determining whether an input pulse has been received in response to said step of comparing responses.

27. For use in a communication system, a method for processing position information corresponding to the position of a moveable device, comprising:

detecting changes in movement in the device;

in response, generating data indicative of position estimations; and using a time-varying-gain algorithm to average the generated data indicative of position estimations.

28. A method for processing position information corresponding to the position of a moveable device, according to claim 27, wherein using a time-varying-gain algorithm to average the generated data indicative of position estimations is implemented without accounting for dynamics of the device.

29. A method for processing position information corresponding to the position of a moveable device, according to claim 27, further including determining a best-performance factor for noise reduction, and providing responsive tracking of user dynamics while reducing only a portion of noise in the position information.

30. A method for processing position information corresponding to the position of a moveable device, according to claim 29, further including comparing responses to the steps of determining and providing responsive tracking.

31. A method for processing position information corresponding to the position of a moveable device, according to claim 27, further including determining whether an input pulse has been received in response to said step of comparing responses.

32. An arrangement for processing position information corresponding to the position of a moveable device, comprising:

means for detecting changes in movement in the device;

means, responsive to the means for detecting, for generating data indicative of position estimations; and means for using a time-varying-gain algorithm to average the generated data indicative of position estimations, without accounting for dynamics of the device.

33. An arrangement for processing position information corresponding to the position of a moveable device, comprising:

means for detecting changes in movement in the device;

means, responsive to the means for detecting, for generating data indicative of position estimations using a linearized least square algorithm; and means for using a time-varying-gain algorithm to average the generated data indicative of position estimations.

* * * * *

UNITED STATES PATENT AND TRADEMARK OFFICE
CERTIFICATE OF CORRECTION

PATENT NO.    : 6,144,918
DATED         : November 7, 2000
INVENTOR(S)   : Meng et al.

Page 1 of 1

It is certified that error appears in the above-identified patent and that said Letters Patent is hereby corrected as shown below:

Abstract,
Line 6, "Tacks" should read -- tracks --.

Column 1,
Following the title, please insert -- This invention was made with Government support under contract N65236-96-C-8608 awarded by the Naval Electronic Systems Engineering Center. The Government has certain rights to this invention. --.

Column 2,
Line 32, "tacks" should read -- tracks --.

Column 4,
Line 1, after "advantageous for", please delete "used for".
Line 22, in both occurrences, "course" should read -- coarse --.

Columns 6,
Line 37, after "by" please insert -- the --.

Column 8,
Line 40-41, after "Taking", please insert -- into --.

Signed and Sealed this

Thirteenth Day of November, 2001

Attest:

NICHOLAS P. GODICI
Attesting Officer   Acting Director of the United States Patent and Trademark Office